United States Patent [19]
Ernster

[11] 3,901,484
[45] Aug. 26, 1975

[54] ELECTRIC FOOD BLENDER

[75] Inventor: Peter Jacob Ernster, Glendale, Wis.

[73] Assignee: Oster Corporation, Milwaukee, Wis.

[22] Filed: Dec. 26, 1973

[21] Appl. No.: 428,086

[52] U.S. Cl. ............................................... 259/108
[51] Int. Cl.² ......................................... B01F 7/20
[58] Field of Search ..................... 259/108, DIG. 35; 241/282.1; 310/62, 63; 242/85.1

[56] References Cited
UNITED STATES PATENTS

| | | | |
|---|---|---|---|
| 2,615,937 | 10/1952 | Ludwig | 310/63 |
| 3,476,331 | 11/1969 | Green, Jr. | 242/85.1 |
| 3,548,280 | 12/1970 | Cockroft | 259/108 X |
| 3,575,524 | 4/1971 | Adajian | 310/62 X |
| 3,738,616 | 6/1973 | Copeland | 259/108 |

FOREIGN PATENTS OR APPLICATIONS
1,012,774  4/1952  France ............................ 259/108

Primary Examiner—Peter Feldman
Assistant Examiner—Alan Cantor
Attorney, Agent, or Firm—George R. Clark; Neil M. Rose; John S. Pacocha

[57] ABSTRACT

An electric food blender having a simplified housing design including an upper plastic housing member supporting the blender vessel and all of the motor components and a lower housing member which forms a support and a closure for the bottom of the housing and includes an integrally molded fan shroud and air directing baffle which directs the cooling air across the blender motor.

7 Claims, 5 Drawing Figures

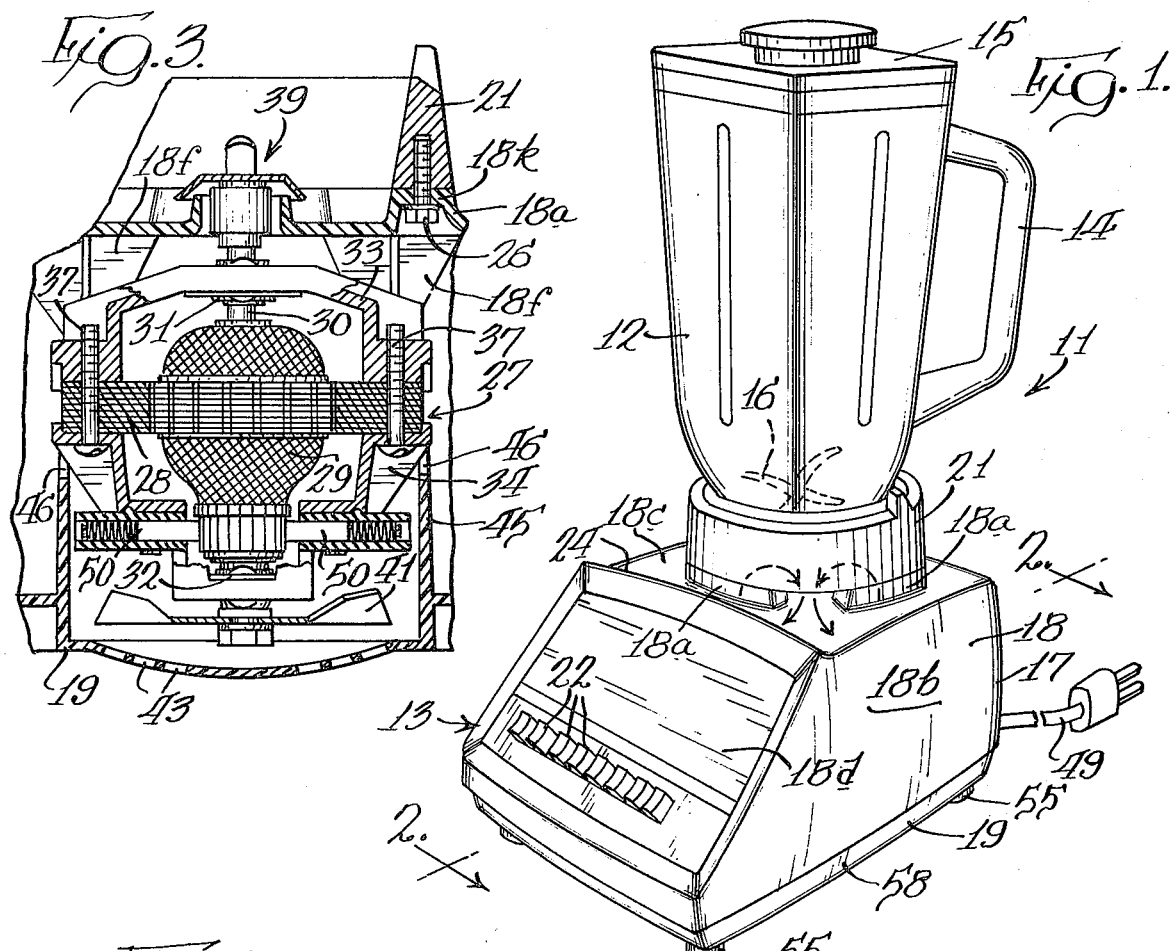
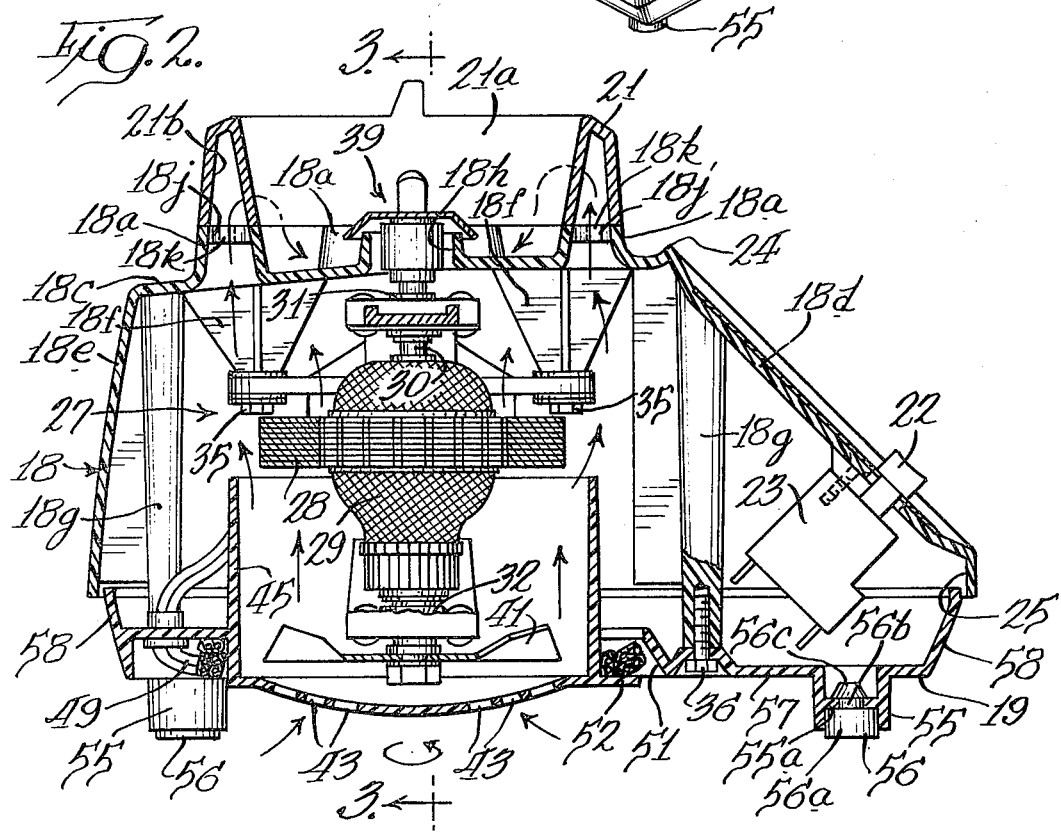

ELECTRIC FOOD BLENDER

BACKGROUND OF THE INVENTION

The invention relates generally to food blenders of the type having a motor enclosed in a housing which includes means for supporting an upright vessel having blade means mounted in the bottom thereof in driven engagement with the motor contained in the housing. As the utility and versatility of the food blender has become more widely recognized, it has become one of the most important home appliances on the market today. The blender is capable of performing a great many tasks from mixing liquids to chopping dry foods. It is also useful for liquifying fruits and vegetables and for blending solids with liquids.

The power requirements of the blender are such that it must have a relatively powerful electric motor on the order of one-third to one-half horsepower. While recognizing the need for a powerful motor for the blender, the consumer is also interested in a compact and easily portable appliance. In order to prevent excessive temperature rise in the motor under heavy loads, it is important to provide adequate circulation of cooling air across the motor. In addition, with the increased popularity of the blender, the competition from a price standpoint has increased considerably to a point where the average retail selling price of a blender is about half of what it was ten or twelve years ago. In order to compete in this market, it is necessary to simplify the blender design and reduce the cost as much as possible.

There have been attempts made in the past to simplify and improve the power unit and motor of a blender by integrating the motor with the housing for the power unit. In one of these prior art blenders, the housing parts included means to direct the motor cooling air across portions of the motor as shown in Copeland et al. U.S. Pat. No. 3,738,616. The problems involved in manufacturing and assembling a blender of the type shown in the Copeland et al. patent tend to offset the advantages flowing from the reduction in the number of parts and apparent simplification in the design.

BRIEF DESCRIPTION OF THE INVENTION

The invention involves a liquifier and blender having a simplified housing in which the lower housing member is an integrally molded plastic part having a baffle to control the air flow on one side thereof and means for cord storage on the other side thereof. The housing includes an inverted cup-shaped upper housing member which encloses and supports the unitary motor, and a lower housing member which closes the downwardly facing opening in the upper housing member. The lower housing member is generally rectangular with a peripheral flange which extends into closely spaced relationship to the upper housing member and a cylindrical baffle which is disposed coaxially with respect to the motor armature and extends upwardly from the bottom wall of the lower housing member. On the underside of the lower housing member, there is an annular groove into which the power cord extends as it exits from the housing. The power cord is adapted to be coiled in this annular groove or recess with integrally molded projections positioned to retain the cord in the recess. A groove extending from this annular recess to the edge of the lower housing member is provided with spaced abutments which engage and grip a section of the power cord. In this way the excess length of power cord which is not required to reach the nearest power outlet may simply be stored in a relatively permanent fashion on the bottom of the lower housing member.

The housing of the blender is formed with a control panel on which the switches for controlling the speed of the motor are mounted, the switches being mounted on the inside of the control panel wall while the manually operable buttons extend through openings to the outside of the housing. The housing is formed with a top wall which angles away from the control panel so as to prevent liquid, spillage or leakage from entering the housing through the openings provides for these switch buttons.

An object of the present invention is to provide an improved liquifier and blender having a simplified motor and housing construction.

A further object of the present invention is to provide an improved blender having a housing member molded of plastic with an air directing baffle formed integrally therewith.

It is another object of the present invention to provide an improved blender having a lower housing member which includes a cylindrical baffle positioned coaxially with the motor armature and extending up into close proximity with the motor supported on the upper housing member.

Still another object of the present invention is to provide an improved blender having a power unit provided with a molded plastic closure plate which has an air flow baffle formed on one side thereof and a cord receiving recess formed on the other side thereof.

Still another object of the present invention is to provide an improved closure plate for the bottom of a blender having an arrangement of air circulation holes to reduce noise and prevent foreign material from entering the blender housing.

Further objects and advantages of the present invention will become apparent as the following description proceeds and the features of novelty which characterize the invention will be pointed out with more particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a blender embodying the invention;

FIG. 2 is a vertical sectional view of the power unit of the blender taken substantially along line 2—2 of FIG. 1;

FIG. 3 is a fragmentary sectional view of the blender motor taken substantially on line 3—3 of FIG. 2;

DESCRIPTION OF THE PREFERRED EMBODIMENT

Figure 4:
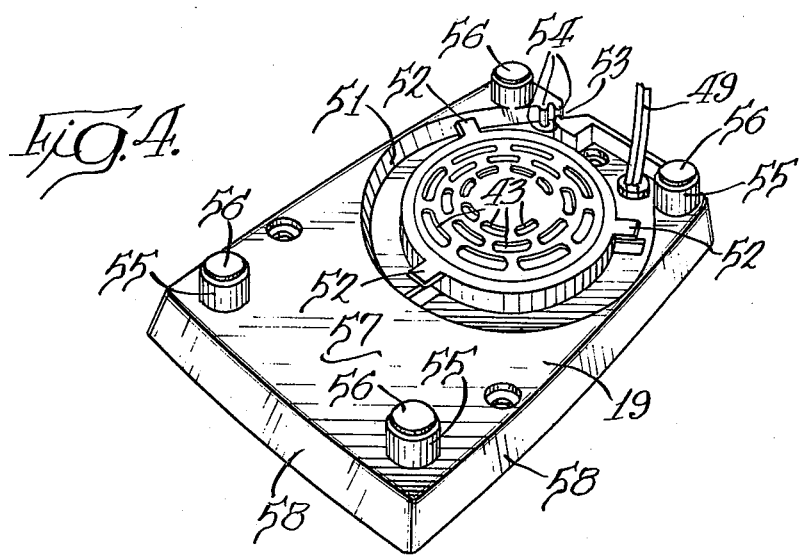
FIG. 4 is a bottom perspective view of the lower housing member of the power unit of FIGS. 1 and 2.

Referring now to the drawings, there is shown in FIG. 1 a liquifier/blender designated generally by reference numeral 11. The blender 11 includes an upright vessel or jar 12 and a power unit 13. The jar 12 is conventional in all respects including a handle 14, a cover 15 and a set of blades 16 which are mounted for rotation in the bottom of the jar 12. In the conventional manner the blades 16 include suitable drive means which extend through the bottom wall of the jar 12 for driving engagement with the power unit 13.

The power unit 13 includes a housing 17 which is made up of an upper housing member 18 and a lower or base housing member 19. The upper housing member 18 is formed with curved abutments 18a to which is secured a jar supporting ring 21. The ring 21 is formed on its interior diameter with a conical or slopping surface 21a which is engaged by the lower portion of the jar 12 in order to support the jar with respect to the power unit 13. In this supported position the blades 16 in the jar 12 are in driven relationship with the power unit 13.

The upper housing member 18 is formed with generally parallel sidewalls 18b, a top wall 18c and front and rear sidewalls 18d and 18e respectively. The front sidewall 18d is angled as is best shown in FIGS. 1 and 2 and forms a control panel within which a series of switch push buttons 22 are located. The buttons 22 operate a switch 23 which connects the motor to the power supply to operate at various selected speeds. As is evident from FIG. 2, the top wall 18c of the power unit 13 is angled downwardly slightly away from the front wall 18d. In addition, at the top of the control panel formed by the wall 18d there is a rib or lip 24 which cooperates with the angled wall 18c to prevent leakage or spillage from running down the front wall 18d into the openings through which the push buttons 22 extend.

As is evident from FIG. 2, the upper housing member 18 has an open bottom defined by a mouth 25. The lower housing member 19 forms a closure for this mouth or opening 25. Received within the housing 17 is a motor 27 which includes a stator 28 and an armature 29. The armature 29 is mounted on a shaft 30 which is supported for rotation on upper and lower armature bearings 31 and 32 respectively. The bearings 31 and 32 are carried by yoke members 33 and 34 which are secured directly to the laminations of the stator 28.

The motor 27 is a unitary assembly which is secured to the underside of the wall 18c of the upper housing member 18 by bolts 35 extending through the upper yoke 33 into downwardly extending bosses 18f on the upper housing member 18. Additional elongated bosses 18g are provided on the upper housing member 18 to receive assembly bolts 36 which secure the lower housing member 19 to the upper housing member 18. One such bolt is shown in FIG. 2. In order to secure the yokes 33 and 34 to to the stator 28, there are provided elongated screws 37 which extend through the lower yoke 34 through the laminations of the stator 28 into threaded engagement with the upper yoke 33.

Figure 5:
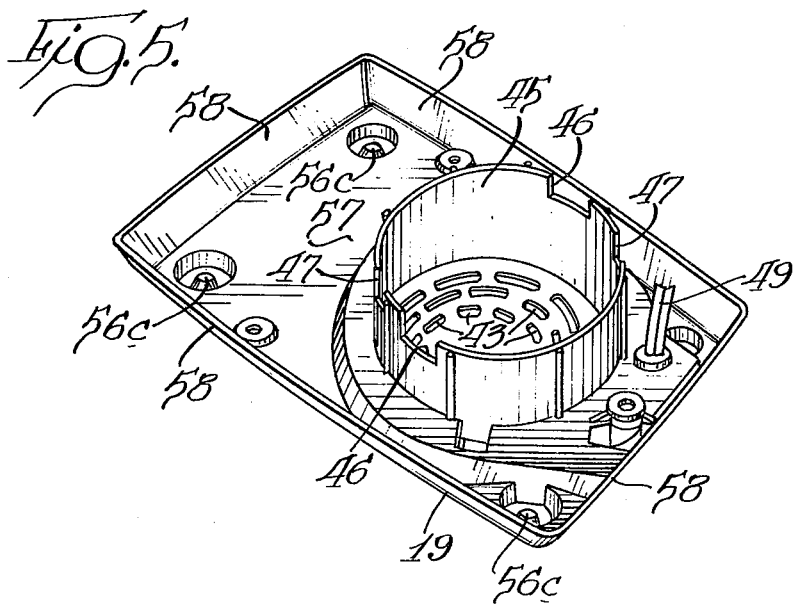
FIG. 5 is a top perspective view of the lower housing member shown in FIG. 4.

At its upper end the armature shaft 30 is formed with a drive coupling 39 which extends through an opening 18h formed in the upper housing member 18. At its lower end the armature shaft 30 receives a multi-blade axial flow fan 41. When the motor is energized it rotates in a direction to cause air to flow axially upwardly across the motor 27. In order to permit such flow the lower housing member 19 is formed with a plurality of air intake openings 43. In addition, the molded plastic lower housing member 19 is formed with a cylindrical baffle 45 which extends upwardly from the bottom wall of the lower housing member 19. The cylindrical wall 45 is coaxial with the armature shaft 30 and has an inside diameter of slightly greater than the fan 41. The baffle 45 extends upwardly into closely spaced proximity to the motor 27. As shown in FIG. 5 the cylindrical baffle 45 is formed with notches 46 which provide clearance for the lower yoke 34. In addition, the baffle 45 is formed with small notches 47 which provide clearance for leads which connect to brushes 50.

As the fan 41 draws motor cooling air inwardly through the openings 43, air is forced upwardly within the baffle 45 into engagement with the motor 27. Some of the cooling air passes across the armature 29, through the air gap between the armature 29 and the stator 28. This air cools both the armature and the stator 28 with its laminations and coils. Some of the air also passes radially outwardly through the small space between the top of the wall 45 and the stator 28. All this air tends to maintain the temperature of the motor 27 at reasonable levels. The air after passing across the motor 27 passes upwardly through slots 18j formed in housing wall 18c into an annular groove 21b in the ring 21 where it moves peripherally in the annular groove 21b and is discharged downwardly in the space between the curved abutments 18a as is best shown in FIG. 1. It should be understood that the slots 18j extend the length of each of the curved abutments 18a except at the center of each abutment 18a there is a rib 18k through which assembly screws 26 extend into threaded engagement with the ring 21. In addition, the annular groove 21b is continuous except where interrupted by the narrow portions which receive the screws 26. The baffle 45 thus provides a simple and effective way of directing essentially all of the motor cooling air drawn in through the openings 43 across the elements of the motor 27 which require cooling.

The openings 43 for the motor cooling air are particularly designed to permit the maximum air flow across the motor 27 while minimizing the noise which might be associated with such air flow. It will be noted that there are three concentric rings of holes, the holes being elongated in shape with the holes in outer ring being more than twice the length of the holes in the inner ring. The webs extending radially outwardly and located between the holes are staggered to provide the maximum rigidity for the webs extending in an annular manner. The width of the holes is less than one-fourth inch to prevent the entry of fingers which might be injured by the fan or foreign objects which might damage the mechanical parts or short out electrical elements within the housing. The hole contours and the relatively rigid molded plastic material permit greater air flow with less noise than the stamped metal closure plates of the prior art.

In order to connect the power unit 13 to a source of electrical energy there is provided a power cord 49 which extends to the interior of the housing 17 where it is connected to the motor 27 and the switch 23. On the bottom of the lower housing member 19 surrounding the area in which the motor cooling openings 43 are provided, there is an annular recess or groove 51 as is best shown in FIGS. 2 and 4. The power cord 49 extends through an opening in the lower housing member 19 into the annular groove 51. The purpose of the groove 51 is to provide a place and manner in which the portion of the power cord in excess of that needed to extend to the nearest outlet is stored on a semipermanent basis. The cord is wrapped around in the annular groove 51 as shown in FIG. 2. In order to retain the coil lengths of cord in the groove 51, the lower housing member 19 is formed with three projections 52 which prevent the cord from accidentally being displaced from the groove 51.

Extending from the groove 51 to the edge of the lower housing member 19 is a groove 53 as shown in FIG. 4. This groove has three abutments 54, two of which are positioned on one side of the groove and one on the other side of the groove 53 to engage a section of the power cord 49 and retain it therebetween. Thus, the user of the blender 11 decides how much of the cord 49 is necessary to reach from the point of usage to the electrical outlet and then winds the remaining portion in the annular groove 51 with the end of the last turn extending between the abutments 54 to retain the stored cord in position on the underside of the lower housing member 19.

In order to support the power unit 13, the lower housing member 19 is formed with four cylindrical bosses 55 which are adapted to receive molded rubber feet 56 as best shown in FIGS. 2 and 4. The feet 56 are each formed with cylindrical portions 56a, neck down portions 56b and conical portions 56c. The conical portions 56c slide through an opening in a wall 55a provided in the cylindrical bosses 55 and thereby retain the feet 56 in assembled relation thereto.

As may best be seen in FIGS. 4 and 5, the lower housing member 19 is a molded plastic member having a bottom wall 57 and angled sidewalls 58. As shown in FIG. 2, the angled sidewalls 58 extend into close proximity with the mouth 25 of the upper housing member 18 to form the enclosure for the motor 27. The lower housing member 19, therefore, performs the multiple functions of closing the mouth in the upper housing member 18 providing storage for the power cord 49 and forming recesses for the rubber support feet 56. The resulting arrangement simplifies the structure of the housing 17 as well as the motor 27. The motor 27 is a simple unitary construction having yokes 33 and 34 secured directly to the stator laminations. The motor is then assembled to housing 17 by means of four bolts 35 which extend into bosses 18f located at the corners of the motor 27. The assembly of the lower housing member 19 to the upper housing 18 completes the assembly of power unit 13 providing the closure for the housing 17, the baffling for the motor cooling air, the strain relief for the power cord 49, the cord storage groove 51 and supports for the feet 56.

Although a particular embodiment of the present invention has been described, it is not intended that the present invention be limited to the particular embodiment illustrated herein since variations and modifications thereof will be apparent within the scope of the present invention to those skilled in the art. It is, therefore, intended that the scope of the present invention be limited only by the claims appended hereto.

I claim:

1. A food blender comprising an upright vessel having rotatable mixing and cutting blades mounted in the bottom thereof; a power unit having a housing enclosing an electric motor; means on said housing for supporting said vessel; said motor including a stator and an armature having commutator brushes engaging the lower end thereof; said armature having a shaft which is supported for rotation about a vertical axis and which extends through said housing into driving engagement with said blades; said housing being formed by a cup-shaped main housing member having sidewalls, a top wall and an open bottom; said stator being mounted on the underside of said top wall, armature bearings for said armature shaft being carried by bearing supports secured to said stator, a fan mounted on the lower end of said armature shaft, a base housing member which is secured to said main housing member to close said open bottom forming an enclosure for said motor, said base housing member being molded plastic having air inlet means through which motor cooling air is drawn in by said fan, an upstanding cylindrical flange integral with said base housing member and surrounding said air inlet means, said flange extending upwardly around the lower end of said armature enclosing said commutator brushes, the top edge of said flange being in close proximity with said stator to direct said motor cooling air across said armature and said stator, air discharge openings in said main housing member to exhaust said motor cooling air.

2. The liquifier and blender of claim 1 having a power cord connected to said motor, said lower housing member being formed with an annular recess on the underside thereof, said cord extending through an opening in said housing which opening is positioned in said annular recess, said cord being adapted to be coiled in said annular recess, means formed on said bottom housing member to retain said cord in coiled position in said annular recess.

3. The liquifier and blender of claim 2 wherein said lower housing member is formed with a slot extending from said annular recess to the edge of said housing, said slot being formed with spaced abutments which grip opposite sides of a section of said cord to retain it in said slot.

4. The food blender of claim 1 having a power cord to supply power to said motor, said base housing member being formed with an annular recess on the underside thereof outwardly of said air inlet means, said flange comprising the inner wall of said annular recess, and means integral with said base housing member and associated with said recess to retain said cord coiled in said recess.

5. The blender of claim 4 wherein said base housing member is formed with a slot extending from said annular recess across the underside to the edge of said base housing member, said slot having spaced abutments which engage and grip a section of said power cord.

6. The blender of claim 4 wherein said base housing member is generally rectangular in shape having integrally molded support bosses in the corners of the underside thereof, said bosses having downwardly facing pockets within which are received rubber supporting feet.

7. A liquifier and blender comprising a power unit which supports an open topped jar having mixing blades at the bottom thereof, said power unit having a housing enclosing a motor with drive means extending into driving engagement with said mixing blades, said motor having an armature disposed vertically within said housing, said armature having a fan for circulating motor cooling air through said housing, a cylindrical baffle partially enclosing said armature for directing said motor cooling air across said motor, a perforate wall formed integrally at the lower end of said cylindrical baffle, a bottom wall connected to the periphery of said baffle along a line spaced above said lower end, said bottom wall and said baffle defining an annular channel facing downwardly for the purpose of receiving and supporting a cord wound around said cylindrical baffle, said bottom wall having a flat portion extending outwardly from said channel and terminating in an upwardly angled integrally formed peripheral flange, feet positioned at the corners of said flat portion to support said housing spaced above a surface to permit air to circulate through said perforate wall, a power cord extending into said housing through an opening in the bottom wall in said annular channel.

* * * * *